(12) United States Patent
Mayerhofer et al.

(10) Patent No.: US 10,125,605 B2
(45) Date of Patent: Nov. 13, 2018

(54) USING DOWNHOLE STRAIN MEASUREMENTS TO DETERMINE HYDRAULIC FRACTURE SYSTEM GEOMETRY

(71) Applicant: Halliburton Energy Services, Inc., Houston, TX (US)

(72) Inventors: Michael J. Mayerhofer, Houston, TX (US); Karn Agarwal, Houston, TX (US); Norman R. Warpinski, Houston, TX (US); Priyesh Ranjan, Houston, TX (US); Glenn McColpin, Houston, TX (US); Mikko Jaaskelainen, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 231 days.

(21) Appl. No.: 15/108,701

(22) PCT Filed: Jan. 20, 2014

(86) PCT No.: PCT/US2014/012178
§ 371 (c)(1),
(2) Date: Jun. 28, 2016

(87) PCT Pub. No.: WO2015/108540
PCT Pub. Date: Jul. 23, 2015

(65) Prior Publication Data
US 2016/0319661 A1 Nov. 3, 2016

(51) Int. Cl.
*E21B 49/00* (2006.01)
*G01V 8/02* (2006.01)
*G01L 1/24* (2006.01)
*G01V 8/10* (2006.01)

(52) U.S. Cl.
CPC ............ *E21B 49/006* (2013.01); *G01L 1/242* (2013.01); *G01L 1/246* (2013.01); *G01V 8/02* (2013.01); *G01V 8/10* (2013.01)

(58) Field of Classification Search
CPC ....... E21B 49/006; G01L 1/242; G01L 1/246; G01V 8/02; G01V 8/10
See application file for complete search history.

(56) References Cited

U.S. PATENT DOCUMENTS

2010/0307755 A1* 12/2010 Xu ..................... E21B 43/26
166/308.1
2011/0141846 A1 6/2011 Uhl et al.
(Continued)

FOREIGN PATENT DOCUMENTS

WO 2010057247 A1 5/2010
WO 2013055677 A2 4/2013

OTHER PUBLICATIONS

"Canadian Application Serial No. 2,934,771, First Office Action dated Apr. 13, 2017", 4 pages.

*Primary Examiner* — Francis C Gray
(74) *Attorney, Agent, or Firm* — Gilliam IP PLLC

(57) ABSTRACT

The use of a distributed fiber optic strain sensor system in horizontal hydraulic fracturing wells to determine several measurements of hydraulic fracture system geometry including number of far-field fractures, hydraulic and propped fracture length, fracture azimuth, and multi-planar fracture complexity.

22 Claims, 5 Drawing Sheets

(56) References Cited

U.S. PATENT DOCUMENTS

| | | | |
|---|---|---|---|
| 2011/0188347 A1* | 8/2011 | Thiercelin | G01V 1/00 367/38 |
| 2011/0229071 A1* | 9/2011 | Vincelette | E21B 43/2406 385/13 |
| 2012/0318500 A1 | 12/2012 | Urbancic et al. | |
| 2013/0100770 A1* | 4/2013 | Diller | G01V 1/288 367/38 |
| 2013/0298665 A1* | 11/2013 | Minchau | E21B 43/26 73/152.51 |
| 2014/0200811 A1* | 7/2014 | Wuestefeld | G01V 1/288 702/14 |

\* cited by examiner

USING DOWNHOLE STRAIN MEASUREMENTS TO DETERMINE HYDRAULIC FRACTURE SYSTEM GEOMETRY

BACKGROUND

Hydraulic fracturing is a technology that has evolved into a mature, complex level. The use of hydraulic fracturing is critical to the economical production of hydrocarbons; and is a significant portion of the well-development cost. Despite the progress, it is still not fully understood, and can be interpreted poorly. Although the physical laws governing fracturing are known, the constant emergence of new mechanisms, such as scale-dependent fracture toughness, complex fracturing, dilatancy, and convection, indicates that the basic physics incorporated into models has not been sufficient to model a fracture fully.

The reasons for the uncertainty surrounding the fracturing process are clear. The Earth is a complex, discontinuous medium, and historically there has been limited technology for observing or inferring fracturing results. Nothing can be done about the complexity of typical reservoirs in the Earth, and one can expect that difficulties with complexity will increase as more marginal reservoirs are exploited. On the other hand, diagnostic capabilities continue to improve and technology is reaching the point where fracture diagnostics can be applied by the average producer in problem situations, in new fields, or for validation of new fracturing techniques.

Furthermore, as operators continue to work in difficult, complex lithologies, it becomes clear that stimulation problems cannot be solved without some diagnostic data from which judicious decisions can be made. Diagnostics cost money, but trial-and-error approaches often cost more money and can result in lost wells. Decisions on well spacing, field layout, sand concentrations and volumes, number of zones that can be stimulated in one treatment, optimum perforation schedule, and many other operational parameters can be made correctly if the proper diagnostic information is available in a timely manner.

Recent advances in hydraulic-fracture-mapping technologies have provided good information on the created fracture length in numerous geologic settings. Before having such measurements, fracture length was estimated using fracture-propagation models, but there was significant uncertainty in the results that cascaded into subsequent production analyses. Practitioners also need to understand how the created fracture length relates to the location of proppant in the fracture and to the producing or effective length to evaluate well performance and improve stimulation designs. Unfortunately, most advanced fracture-mapping technologies that provide accurate measurements of the created fracture length have not provided insights into the propped and effective fracture lengths. Advanced production-data analyses (PDAs), pressure-transient testing, and/or numerical reservoir modeling are required to determine the effective fracture length.

The common viewpoint of the far-field hydraulic fracture geometry is changing. Data sets compiled over the last decade are incompatible with the conventional picture of a single, bi-wing, planar hydraulic fracture. These data sets include (1) recovered cores, (2) minebacks, (3) microseismicity, (4) overcores and borehole video, (5) treatment pressure response, and (6) surface tilts, in conjunction with advancements in laboratory simulations, studies of natural hydraulic fracture analogues, and improvements in numerical simulations. The single, planar, farfield fracture viewpoint finds its roots and development in early theory and simplified laboratory studies that were pre-disposed to single, planar fracture geometry. Replacing this viewpoint is a new perspective that includes a strong potential for creating multiple, far-field fractures. The implications of multiple, far-field fracturing has resulted in adjustments to completion and stimulation strategies to address and affect the overall fracture geometry.

One of fracture technology's last frontiers is the understanding and optimization of far-field fracture geometry and proppant placement. Prior to the last decade, the viewpoint of far-field geometry was a single, bi-wing, planar fracture that opened against the least principal stress. But a growing body of data contradicts this viewpoint and a new perspective is emerging. This new viewpoint includes the potential for creating multiple, far-field fractures. As we discuss, the foundation of the new paradigm includes recent field studies, improved laboratory simulations, and advanced theoretical modeling.

In addition knowing the direction or azimuth of the fracture orientation is important in development of a low permeability reservoir with horizontal wellbores. The orientation of the horizontal wellbore will determine if the hydraulic fractures are longitudinal or transverse to the wellbore. The angle of the wellbore to the hydraulic fracture not only affects the recovery factor from the reservoir, but also influences the completion strategy.

Thus practitioners today would like to have much better diagnostics on several hydraulic fracture properties:
Number of hydraulic fractures simultaneously propagating in the far-field
Hydraulic and propped fracture length
Hydraulic fracture azimuth
Multi-planar complex fracture growth Artificially created hydraulic fractures are primarily mode-I tensile fractures. Geo-mechanical modeling shows that tensile hydraulic fractures create a characteristic strain distribution in the deformed rock around them. Our modeling shows that strain measurements with sufficient resolution in a properly instrumented monitor well (such as a horizontal well with high resolution distributed strain sensing) can provide information about the approaching hydraulic fractures from an offset stimulation treatment. Approaching hydraulic fractures generate a characteristic strain pattern axially along the monitor wellbore, which can be analyzed to evaluate the above listed fracture properties.

There is a need the to utilize these new capabilities for high resolution distributed strain sensing to develop new diagnostics of hydraulic fracture properties.

DETAILED DESCRIPTION

This need is addressed in the following approach.

Figure 1:
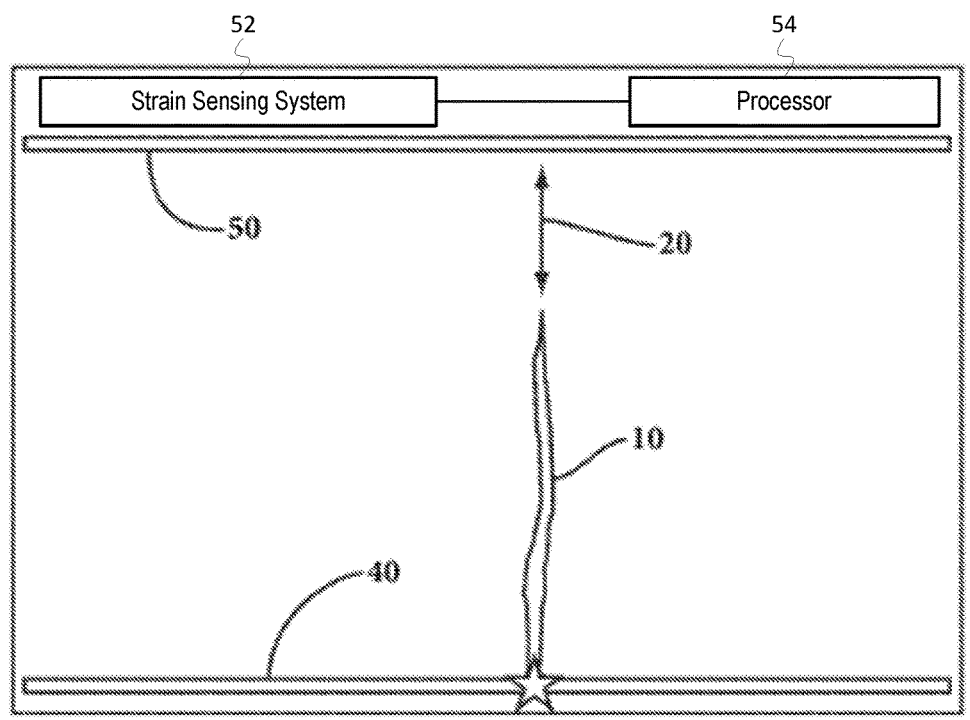
FIG. 1 illustrates a strain monitoring system and how a single hydraulic fracture might propagate from a horizontal treatment well toward a strain monitor well.

FIG. 1 shows a conceptual sketch of a strain monitoring setup and a single hydraulic fracture 10 propagating from a horizontal treatment well 40 towards the strain monitor well 50. The view of FIG. 1 is from the surface looking down, so monitor well 50 and treatment well 40 are running horizontal to the surface and the two wellbores are in proximity and are approximately parallel. Distance 20 is the distance from the monitor well to the fracture tip. It should be noted that the terms monitor well and treatment well are used for illustrative purposes. Each well could have both treatment and monitoring capabilities built in. For purposes of this illustration the monitor well 50 is equipped with a high-resolution distributed or quasi-distributed strain sensing system 52 that provides measurements of axial strain along the horizontal axis.

The strain sensing system 52 can be based on fiber optic technology, and may be based on Rayleigh scattering, Brillouin scattering, Fiber Bragg Grating (FBG) technology or any other technology that may be used to monitor strain in optical fibers. The sensing technology may use Optical Time Domain Reflectometry (OTDR), Optical Frequency Domain Reflectometry (OFDR), Optical Interferometric techniques based continuous wave or puked optical sources. The strain sensing system 52 may utilize one or several technologies simultaneously to enhance resolution.

The strain sensing system 52 may measure absolute strain or measure deviations from a base-line. It is desirable to couple the optical fiber to the formation as efficiently as possible, and strain sensing cables may be epoxy filled or otherwise closely couple the optical fiber to the outer sheath of the sensing cable. The strain sensing cable may be cemented in-place in the monitoring well for enhanced performance. It is also desirable to have a well-known strain transfer function of the strain sensing cable for accurate interpretation. High-resolution strain sensing cables may have a built in strain profile due to the manufacturing process, and this strain profile may be larger than the expected strain measurements. Cable installation down-hole may also add strain variations along the length of the sensing cable so it may be beneficial to measure deviations from a base-line after the cable has been installed in the monitoring well.

The strain sensing system 52 may also need to be temperature compensated for accurate strain measurements, as many strain-sensing technologies are both temperature and strain sensitive. Accurate distributed temperature profiles can be measured with e.g. Raman based (Distributed Temperature Sensing (DT) systems. The temperature effects can then be subtracted from the strain profile to achieve accurate high-resolution strain profiles. Temperature compensation can alternatively be done by decoupling optical fibers from strain in the cable. Options to de-couple strain include to cable optical fibers in gel-filled cables to minimize strain transfer into the temperature sensing fiber, and this can be done in e.g. Brillouin based sensing systems. Other options include housing single point temperature sensors, e.g. FBG's, in a capillary tube to prevent strain transfer, and you would then need a pair of FBG's at each sensing location where FBG 1 measures temperature only and FBG 2 at a close proximity measure both temperature and strain.

The strain sensing system 52 may utilize one cable for strain sensing and one cable for temperature compensation, or a single cable with multiple optical fibers where the first optical fiber is used for strain sensing, the second optical fiber is used for temperature sensing, the third optical fiber is used for acoustic sensing etc. The strain sensing system 52 may utilize one or several technologies simultaneously to enhance resolution and performance, and the selected technologies may drive the cable design. A person skilled in the art of fiber optic sensing knows the trade-offs and the examples above are by no way an exhaustive list of technologies or combinations to make a working fiber optic strain sensing system aligned with the spirit of the invention.

FIG. 1 further depicts a processor 54 at the surface of the downhole system programmed to process the information from the high resolution distributed strain sensing system 52 and record, display, or transmit distributed axial strain data needed to determine desired hydraulic fracture system geometry properties. The processor 54 may be any instrumentality or aggregate of instrumentalities operable to compute, classify, process, transmit, receive, retrieve, originate, switch, store, display, manifest, detect, record, reproduce, handle, or utilize any form of information, intelligence, or data needed to determine desired hydraulic fracture system geometry properties.

Figure 2:
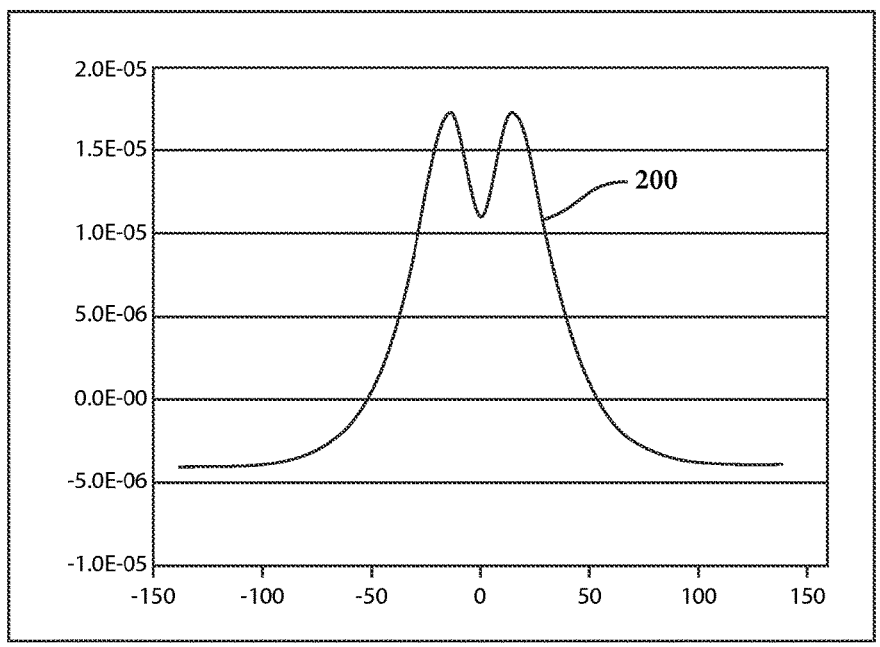
FIG. 2 illustrates a pattern of axial strain across a horizontal monitor well for an illustrative hydraulic fracture.

FIG. 2 shows an illustrative axial strain pattern 200 in a horizontal observation well for a single hydraulic fracture from treatment well 50 and approaching monitor well 40 at a 90 degree angle with 20 meter distance between the hydraulic fracture tip and monitor well 50. The y-axis represents the axial strain (dimensionless) measured along the horizontal or X direction along the monitor well and the X-axis is the distance in meters along the horizontal or X direction of the monitor well. In the plot the positive strain denotes extension, whereas the negative strain is compression. The characteristic pattern exhibited here includes two strain peaks, whereby the separation of those peaks is a measure of the distance to the hydraulic fracture tip.

Figure 3:
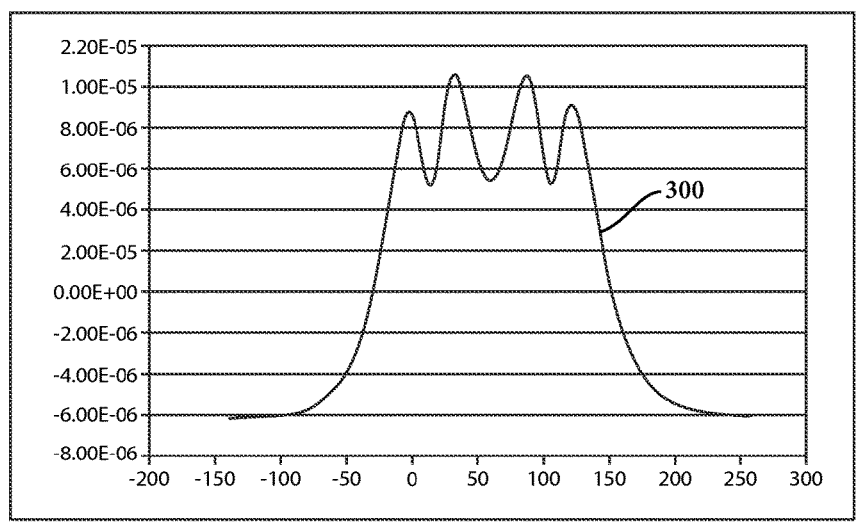
FIG. 3 illustrates an alternate pattern of axial strain across a horizontal monitor well for two hydraulic fractures.

If more than one fracture is approaching, the axial strain pattern changes significantly. FIG. 3 illustrates the axial strain 300 for two parallel hydraulic fractures spaced 90 meters from each other at 90-degree approach angle and 20 meter fracture tip distance. The y-axis again represents the axial strain measured along the horizontal or X direction along the monitor well and the X-axis is the distance in meters along the horizontal or X direction of the monitor well. The plot indicates two pairs of strain peaks corresponding to the two fractures. Thus, the characteristic strain pattern can provide important conclusions about the number of far-field hydraulic fractures. The two peaks on the left side of the plot represent the left fracture and the two peaks on the right represent the right fracture.

Our modeling further shows that the separation of the two maximum strain peaks is related to the distance of the approaching hydraulic fracture tip, thus providing a measurement of fracture length from the treatment well. Views such as FIG. 3 and more complex ones involving more fractures provide an important diagnostic of multi-planar complex growth fractures. These more complex cases involving close multiple fractures can be used to interpret fracture geometries by use of geo-mechanics modeling.

Figure 4:
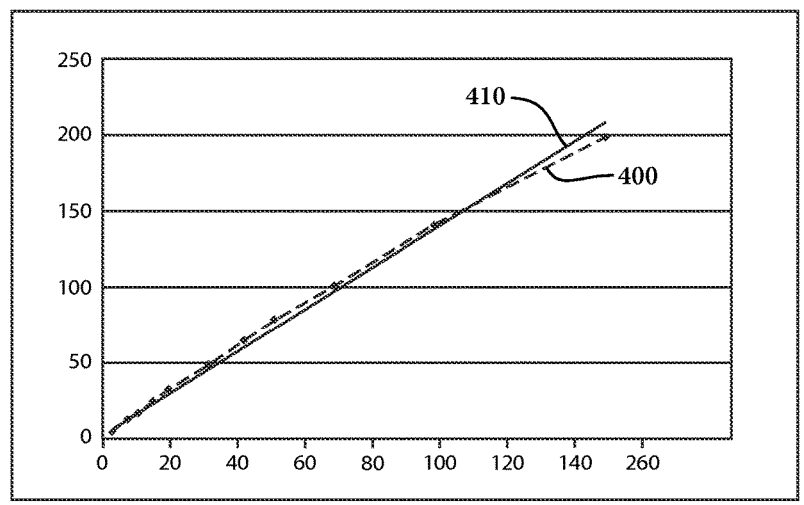
FIG. 4 illustrates the separation between strain peaks as a function of distance from the fracture tip for a 3D elliptic crack.

FIG. 4 shows plot of distance between strain peaks and distance to fracture tip for a 3-D elliptical fracture. The y-axis is the separation between humps of the strain peaks and the x-axis is the distance from the fracture tip. Dashed line 400 represents measured data and straight line 410 represents a one-to one linear relationship for comparison. The relationship is nearly linear, and geometric, thus allowing for a quick estimate of distance to fracture tip and fracture half-length, which in the case of 90 degree approach angle is the difference between well spacing and distance to fracture tip from monitor well. For example, in FIG. 4, if the distance between peaks is 100 (y-axis), the distance to fracture tip is about 72 (x-axis). In addition, the magnitude of strain also increases significantly as the fracture approaches the monitor well. After the fracture treatment is completed, and flow back of hydrocarbons initiated, an increasing distance between strain peaks could indicate a receding hydraulic fracture tip if it was not fully propped, thus potentially providing an estimate of propped fracture length.

Figure 5:
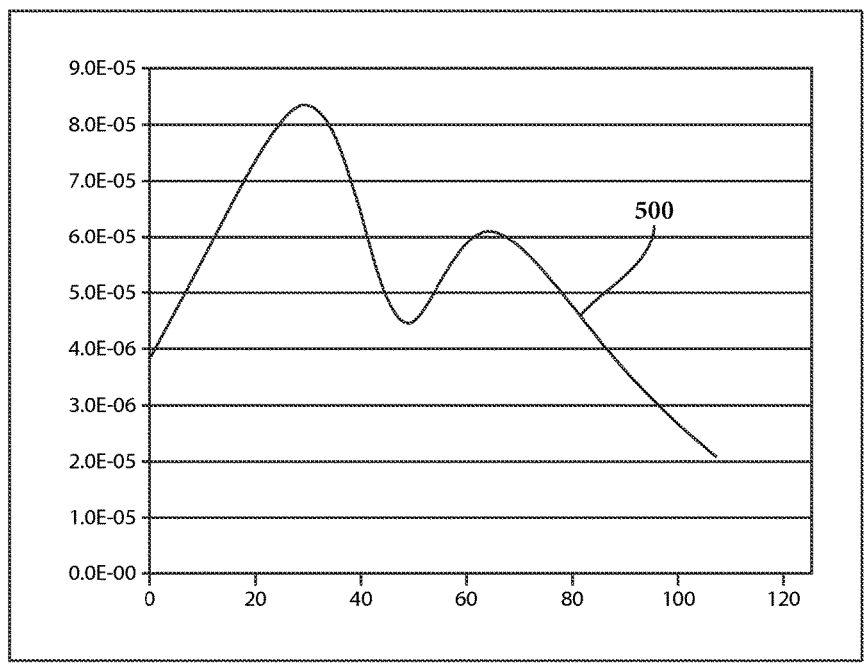
FIG. 5 illustrates an asymmetric pattern of axial strain across a horizontal monitor well for a different illustrative hydraulic fracture.

FIG. 5 shows the impact of fracture approach angle on the axial strain response. Knowing the direction or azimuth of the fracture orientation is important in development of a low permeability reservoir with horizontal wellbores. The orientation of the horizontal wellbore will determine if the hydraulic fractures are longitudinal or transverse to the wellbore. The angle of the wellbore to the hydraulic fracture not only affects the recovery factor from the reservoir, but also influences the completion strategy.

The FIG. 5 pattern 500 illustrates two strain peaks that are asymmetric with one being larger than the other. Again the y-axis is axial strain along the monitor well and the x-axis is the distance along the X direction for the monitor well. The difference in peak size is a measure of the approach angle. The plot shows an approach angle of roughly 70 degrees for a single hydraulic fracture. This information can be used to estimate if fractures are propagating orthogonal to the wellbores or not.

The strain measurement could better define the fracture length and number of tensile hydraulic fractures propagating in the far-field as well as the final propped hydraulic fracture length. Existing technologies such as distributed temperature sensing and distributed acoustic sensing mainly measure near-wellbore injection entry points but cannot measure the geometry distribution of fractures in the far-field. Micro seismic mapping measures the far-field fracture geometry and azimuth but in horizontal well completions with multiple perforation/entry points it is many times very difficult to discern the individual dominant fracture planes of the tensile hydraulic fractures since micro seismic events are shear-failures around the tensile fracture, thus forming a diffuse image, with insufficient resolution in terms of number of fracture planes. Tilt meter or Micro deformation mapping is also a deformation based technology which is used to measure the far-field fracture geometry and azimuth but lacks the resolution to discern individual fracture planes and cannot be used in horizontal monitor wellbores.

The number and individual lengths of fracture planes that propagate in the far-field are an important input for fracture models as well as reservoir modeling tools to optimize fracture completion and well spacing strategies. The technology described herein can provide more detail of the dominant hydraulic fracture structure within the traditional SRV (Stimulated Reservoir Volume) measured by microseismic mapping in unconventional reservoirs. When the strain measurements are performed in conjunction with other diagnostic measurements a more complete picture and image of hydraulic fractures can be created. The potential of estimating a propped hydraulic fracture length is an industry challenge that has not been overcome yet but is a highly desired goal of fracture diagnostic measurements. This technology could provide a start for overcoming this challenge.

Although certain embodiments and their advantages have been described herein in detail, it should be understood that various changes, substitutions and alterations could be made without departing from the coverage as defined by the appended claims. Moreover, the potential applications of the disclosed techniques is not intended to be limited to the particular embodiments of the processes, machines, manufactures, means, methods and steps described herein. As a person of ordinary skill in the art will readily appreciate from this disclosure, other processes, machines, manufactures, means, methods, or steps, presently existing or later to be developed that perform substantially the same function or achieve substantially the same result as the corresponding embodiments described herein may be utilized. Accordingly, the appended claims are intended to include within their scope such processes, machines, manufactures, means, methods or steps.

The invention claimed is:

1. A method for using downhole strain measurements to determine hydraulic fracture geometric properties, said method comprising:
   a. positioning at least one monitoring well in proximity to at least one horizontal treatment well, wherein the monitoring well is equipped with a distributed strain sensing system that includes fracture strain measurement components;
   b. during and immediately after the fracturing operation, measuring, by the fracture strain measurement components within the distributed strain sensing system, axial strain; and
   c. analyzing an axial strain pattern within axial strain data derived from the measured axial strain to determine at least one hydraulic fracture geometric property of interest.

2. The method of claim 1, wherein the axial strain pattern includes two strain peaks and a separation of those two peaks is a measure of the distance to a single hydraulic fracture tip.

3. The method of claim 2, wherein the axial strain pattern as a function of distance includes two strain peaks that are asymmetric and a difference in size of the peaks is a measure of an approach angle of a fracture.

4. The method of claim 1, wherein the distributed strain sensing system includes a temperature sensing fiber that is coupled to a strain detection cable that is included in the fracture strain measurement components.

5. The method of claim 1, wherein the distributed strain sensing system is based on Brillouin scattering technology.

6. The method of claim 1, wherein the distributed strain sensing system is based on fiber Bragg grating technology.

7. The method of claim 1, wherein the distributed strain system technology is based on optical time domain reflectometry.

8. The method of claim 1, wherein the distributed strain sensing system is based on optical frequency domain reflectometry.

9. The method of claim 1, wherein the distributed strain sensing system technology is based on optical interferometric techniques based on continuous wave sources.

10. The method of claim 1, wherein the distributed strain sensing system is based on optical interferometric techniques based on pulsed optical sources.

11. A system for using downhole strain measurements to determine hydraulic fracture geometric properties, said system comprising:
    a. at least one monitoring well deployed in proximity to at least one hydraulic fracturing treatment well; wherein the at least one monitoring well is equipped with a distributed strain sensing system that includes fracture strain measurement components that are configured to, during and immediately following a fracturing operation, measure fracture-induced axial strain; and b. a processor programmed to process an axial strain pattern derived based on axial strain information from the distributed strain sensing system to determine hydraulic fracture geometric properties.

12. The system of claim 11, wherein the axial strain information includes at least axial strain patterns distributed along a horizontal or x-axis of the monitoring well.

13. The system of claim 11, wherein the axial strain information includes measures of distances between strain peaks in two of more axial strain patterns.

14. The system of claim 11, wherein the axial strain information includes measures of the number of strain peaks in two or more axial strain patterns.

15. The system of claim 11, wherein the axial strain information includes measures of the heights of the strain peaks in two or more axial strain patterns.

16. The system of claim 11, wherein the distributed strain sensing system is based on Rayleigh scattering technology.

17. The system of claim 11, wherein the distributed strain sensing system is based on Brillouin scattering technology.

18. The system of claim 11, wherein the distributed strain sensing system is based on fiber Bragg grating technology.

19. The system of claim 11, wherein the distributed strain sensing system is based on optical time domain reflectometry.

20. The system of claim 11, wherein the distributed strain sensing system is based on optical frequency domain reflectometry.

21. The system of claim 11, wherein the distributed strain sensing system is based on optical interferometric techniques based on continuous wave sources.

22. The system of claim 11, wherein the distributed strain sensing system is based on optical interferometric techniques based on pulsed optical sources.

* * * * *